United States Patent [19]

Park

[11] Patent Number: 4,475,797

[45] Date of Patent: Oct. 9, 1984

[54] COLOR CATHODE RAY TUBE SCREENING EXPOSURE METHOD AND APPARATUS

[75] Inventor: Yong S. Park, Barrington, Ill.

[73] Assignee: Zenith Electronics Corporation, Glenview, Ill.

[21] Appl. No.: 403,840

[22] Filed: Jul. 30, 1982

[51] Int. Cl.[3] .......................... G03C 5/00; G03B 41/00

[52] U.S. Cl. .......................................... 354/1; 430/26; 313/634

[58] Field of Search ................. 354/1; 430/24, 26, 25; 313/634, 408

[56] References Cited

U.S. PATENT DOCUMENTS

| | | | |
|---|---|---|---|
| 3,146,368 | 8/1964 | Fiore . | |
| 3,587,417 | 6/1971 | Balder | 354/1 |
| 3,590,303 | 6/1971 | Coleclough | 430/26 |
| 3,601,018 | 8/1971 | Lange | 354/1 |
| 3,667,947 | 6/1972 | McKee | 354/1 |
| 3,838,432 | 9/1974 | Park | 354/1 |
| 3,856,525 | 12/1974 | Inoue | 354/1 |
| 3,885,181 | 5/1975 | Nelson | 313/634 |
| 3,888,673 | 6/1975 | Suzuki et al. | 354/1 |
| 3,890,151 | 6/1975 | Suzuki et al. | 354/1 |
| 3,947,718 | 5/1976 | van Lent | 313/408 |
| 3,949,411 | 4/1976 | Yonai et al. | 354/1 |
| 4,070,596 | 1/1978 | Tsuneta et al. | 430/25 |
| 4,078,239 | 3/1978 | Prazak et al. | 354/1 |
| 4,132,470 | 1/1979 | Heek | 354/1 |
| 4,256,390 | 3/1981 | Fisher et al. | 354/1 |

FOREIGN PATENT DOCUMENTS 1513391 6/1978 United Kingdom .

OTHER PUBLICATIONS

"Contoured-Line Screens for Color Picture Tubes", IEEE Transactions on Consumer Electronics, vol. 24, No. 1, 2/1978, pp. 120-125, A. M. Morrell.

*Primary Examiner*—A. A. Mathews
*Attorney, Agent, or Firm*—Cornelius J. O'Connor

[57] ABSTRACT

This disclosure depicts method and apparatus useful in fabricating a screen of a color cathode ray tube of the slot mask, stripe-screen type and more particularly method and apparatus for exposing a photosensitive coating on the concave inner surface of the faceplate of such a tube through a slot mask serving as an exposure master. Latent screen stripe images are formed whose width increases with increasing radial distance along the screen "pitch" axis perpendicular to the screen stripe images. The method comprises supporting a curved faceplate which has on its concave inner surface a photosensitive coating; supporting adjacent the faceplate inner surface a slot mask defining an array of columns of spaced slots; supporting a line source of radiation actinic to said coating on or near a central axis of the faceplate and spaced from said coating, with the source axis aligned parallel to said columns of spaced slots in said mask, said light source producing a linear light-emitting volume having a major cross-sectional axis which is parallel to the faceplate central axis and a major axis dimension which is substantially greater than the minor cross-sectional axis dimension of said light-emitting volume; and exposing said coating to said light source, such that the latent screen stripe images formed on said coating through said slots, for uniform exposure time and slot width, increase in width in a radial direction away from said screen center along said screen pitch axis.

8 Claims, 8 Drawing Figures

COLOR CATHODE RAY TUBE SCREENING EXPOSURE METHOD AND APPARATUS

BACKGROUND OF THE INVENTION

1. Field of the Invention

This invention relates generally to the processing of screens for color cathode ray tubes. More particularly, this invention is directed to improved apparatus and method for forming phosphor and black grille stripes in color cathode ray tubes, and is especially useful for forming extra wide phosphor stripes overlapping black stripes on a shadow mask CRT of the type having a graded pitch mask.

2. Definitions

As used herein the term "pitch axis" means an axis in the screen or mask plane perpendicular to the shadow mask slot lines and to the screen stripe images.

As used herein the term "graded pitch" (mask or screen) means a shadow mask of the slot (or "slit") type or screen of the stripe (or "line") type having a slot/-stripe pitch which increases with increasing radial distance from the faceplate center along the pitch axis.

3. Art

The following are being submitted to the Patent and Trademark Office for its evaluation as to their possible relevance to the claimed subject matter. It is believed to be the closest of the art of which applicant(s) is aware, but applicant(s) makes no admission as to the fact of its being "prior art", to its relevance in fact, to its legal sufficiency or to its priority in time, nor does applicant(s) represent that no better art exists.

| Item | Relevant Disclosure |
|---|---|
| 1. U.S. Pat. No. 3,947,718 - van Lent | Slot-type shadow mask CRT with slot pitch increasing off axis |
| 2. "Contoured-Line Screens for Color Picture Tubes"; IEEE Transactions on Consumer Electronics, Vol. 24, No. 1, 2/78, pgs. 120-125, A.M. Morrell | Slot-type shadow mask CRT with slot pitch increasing off axis |
| 3. U.S. Pat. No. 3,590,303 - Coleclough | Dot-type shadow mask CRT with hole pitch increasing off axis |
| 4. U.S. Pat. No. 3,146,368 - Fiore et al | Dot-type black grille shadow mask CRT |
| 5. U.S. Pat. No. 4,070,596 - Tsuneta et al | Slot-type black grille shadow mask CRT |
| 6. U.S. Pat. No. 3,888,673 - Suzuki et al | CRT screen exposure method and apparatus |
| 7. U.S. Pat. No. 3,890,151 - Suzuki et al | CRT screen exposure method and apparatus |
| 8. U.S. Pat. No. 3,949,411 - Yonai et al | CRT screen exposure method and apparatus |
| 9. U.S. Pat. No. 3,601,018 - Lange | CRT screen exposure method and apparatus |
| 10. U.S. Pat. No. 4,078,239 - Prazak et al | CRT screen exposure method and apparatus |
| 11. U.S. Pat. No. 3,838,432 - Park | CRT screen exposure method and apparatus |
| 12. U.S. Pat. No. 3,667,947 - McKee | CRT screen exposure method and apparatus |
| 13. G.B. Pat. No. 1,513,391 - Phillips Electronic & Associated Industries Ltd. | CRT screen exposure method and apparatus |
| 14. U.S. Pat. No. 3,856,525 - Inoue | CRT screen exposure method and apparatus with oscillating light source for widened phosphor elements |

4. Shortcomings of the Prior Art

Among the problems, defects or other drawbacks found in the prior art are the following:

1. Slot-type shadow mask CRT's of the "graded pitch" type with increasing slot pitch off-axis provide increased manufacturing tolerance, but necessitate formation of phosphor strips wider than can be conveniently and reliably fabricated with conventional screen techniques. The following will explain.

It is conventional in tubes having graded pitch masks to seek standard mask transmission profiles from mask center to mask edge (along the pitch axis) by reducing or eliminating the conventional aperture size grading from the center to screen edge—normally provided to give increased manufacturing tolerance.

Having done this, it can be seen that the spacing between the grille openings within which the individual phosphor stripes are deposited is greater than with prior slot mask tubes not having a graded pitch mask and increases with radial distance from the screen center.

It is desirable during deposition of the phosphor stripes to fill not only the grille openings with phosphor material, but to extend the phosphor material onto to the back side of the contiguous black grille areas to an extent that each phosphor stripe touches or nearly touches its neighboring phosphor stripe. This is done to improve the adhesion of the phosphor stripes to the back of the black grille, and to maximize the "leak through" of light emitted by phosphor material overlapping the black grille when bombarded by the electron beam.

The greater guard band or tolerance at the side edges of graded pitch screens, and the widened phosphor stripes required, creates the problem to which this invention is addressed—that is, how to conveniently, reliably and efficiently deposit the necessarily wider phosphor stripes on the black grille of a negative guard band, slot mask, graded pitch type color CRT.

2. In the screening of slot-type shadow masks by conventional methods, the time required to expose photosensitive materials at the edges of the screen is very substantially greater than in the center of the screen (three times, for example). Edge exposure time thus determines the maximum through-put screening rate of CRT faceplates in a CRT factory.

3. Other shortcomings are described in noted prior art U.S. Pat. No. 3,856,525. The solution proposed in the '525 patent suffers, inter alia, from a requirement for apparatus which reciprocates the screen-exposing light source—with the cost, unreliability, maintenance, and other such problems customarily attending use of such apparatus.

FEATURES, ADVANTAGES AND OBJECTS OF THE INVENTION

Among the features, advantages and objects of the present invention are the following:

1. In the manufacture of slot-mask type color cathode ray tubes, to provide method and apparatus especially useful in the formation of the extra-wide off-axis phosphor stripes in color CRT screens of the graded pitch type having a stripe pitch which increases with increasing radial distance from the CRT axis.

2. In the manufacture of slot-mask type color cathode ray tubes, to provide method and apparatus for exposing photosensitive materials during phosphor and grille screen operations which reduces the necessary screen edge exposure time and thus reduces the overall time interval necessary for a screening operation.

3. It is yet another object of the invention to provide such method and apparatus which utilizes a fixed light source and thus requires no moving light source parts, and which is lower in maintenance and overall cost than prior systems with a moving light source.

BRIEF DESCRIPTION OF THE FIGURES

The figures are views depicting the invention.

DESCRIPTION OF THE PREFERRED EMBODIMENT(S)

Figure 1:
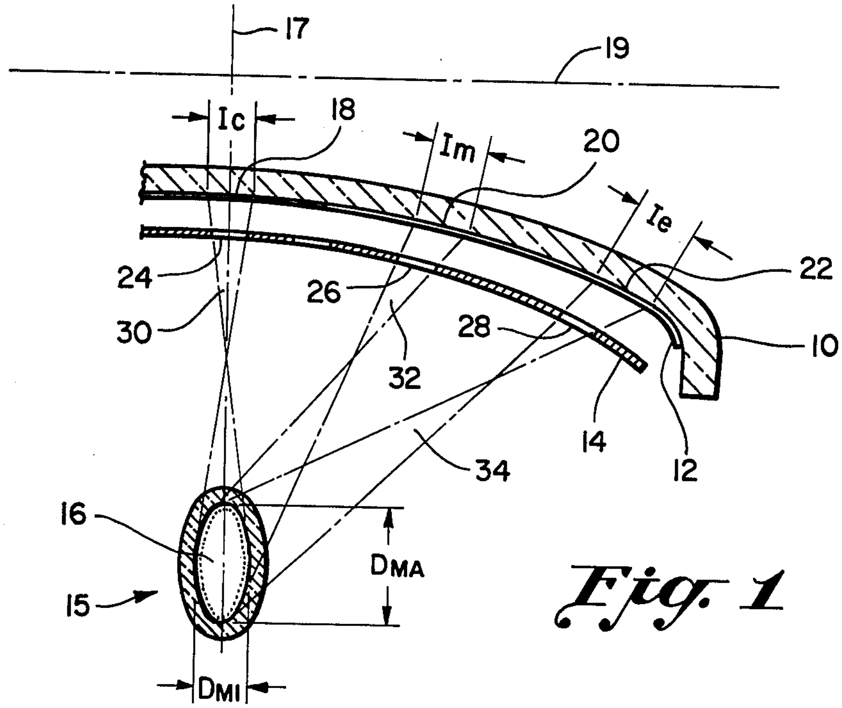
FIG. 1 is a highly schematic, fragmentary, side elevation, partially sectioned view illustrating method and apparatus in accordance with this invention for exposing a photosensitive coating on the concave inner surface of the faceplate of a slot mask, stripe screen color cathode ray tube.
Figure 2:
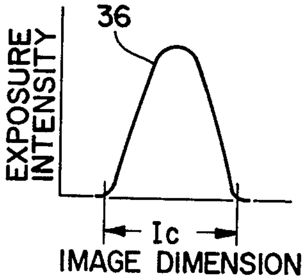
FIGS. 2, 3 and 4 are diagrams graphically portraying, in schematic form, the screen stripe images formed on the photosensitive coating on the inner surface of the faceplate at center, medial, and edge portions of the screen.
Figure 3:
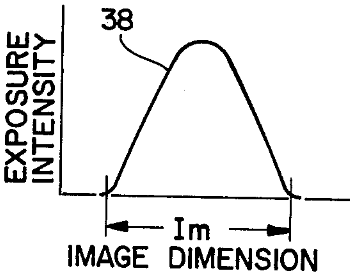
Figure 4:
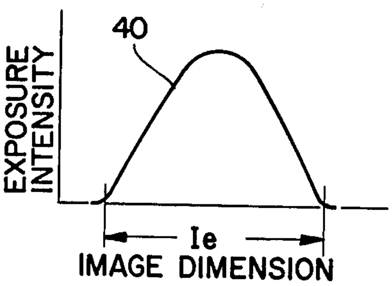

This specification includes a description of the invention and of the best mode presently contemplated for carrying out the invention and the claims.

Best Mode

Figure 6:
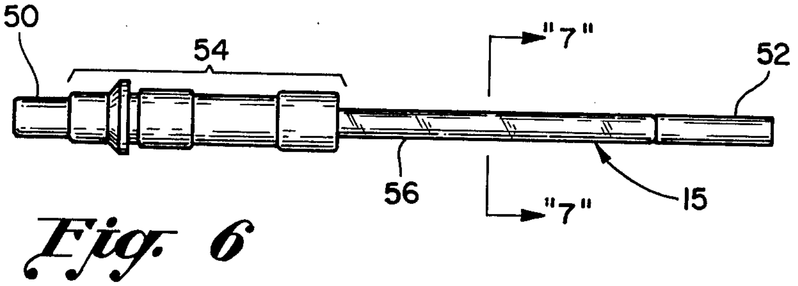
FIGS. 6 and 7 are side elevational and end views of a line source lamp for practicing the screen exposure method and apparatus according to this invention.
Figure 7:
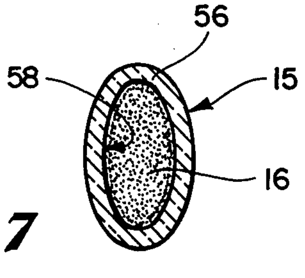
Figure 5:
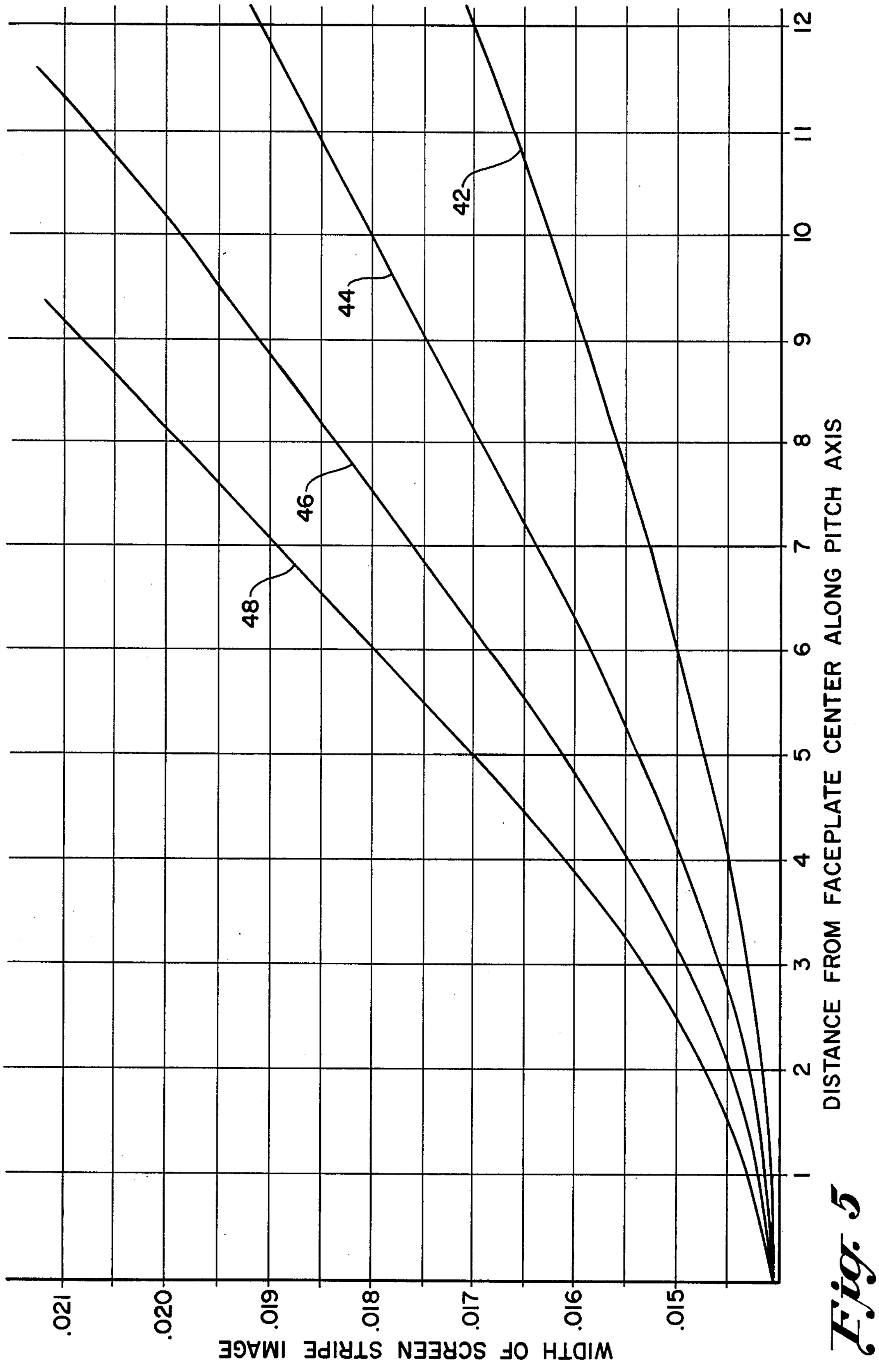
FIG. 5 is a graph of latent screen stripe image versus radial distance from the center of the faceplate along the screen "pitch" axis perpendicular to the screen stripe images.

The invention is disclosed in the drawing(s) as follows:

| Referent Number | Referent Name | Brief Statement of Referent Connections, Function, Operation and/or Result, if Appropriate |
|---|---|---|
| 10 | faceplate | May be cylindrical, or have three dimensional curvature |
| 12 | photosensitive coating | Photosensitized phosphor slurry |
| 14 | shadow mask | Cylindrical or with three-dimensional curvature; slot type with tie-bar-spaced slots or slit type with uninterrupted slit openings; preferably of "graded pitch" type having a slot pitch which increases with increasing radial distance along the pitch axis. |
| 15 | light source | Preferably high pressure mercury capillary arc lamp; see FIGS. 6, 7 |
| 16 | light-emitting volume | Gas discharge formed within bore 58; gas discharge substantially conforms to configuration of bore 58. |
| 17 | faceplate central axis | |
| 18 | latent phosphor stripe image of width Ic | Formed in photosensitized phosphor slurry |
| 19 | slot/stripe pitch axis | |

-continued

| Referent Number | Referent Name | Brief Statement of Referent Connections, Function, Operation and/or Result, if Appropriate |
|---|---|---|
| 20 | latent phosphor stripe image of width Im | Formed in photosensitized phosphor slurry |
| 22 | latent phosphor stripe image of width Ie | Formed in photosensitized phosphor slurry |
| 24 | shadow mask slot | Slots 24, 26, 28 may be of approximately equal width, as shown |
| 26 | shadow mask slot | |
| 28 | shadow mask slot | |
| 30 | exposure light beam | |
| 32 | exposure light beam | |
| 34 | exposure light beam | |
| 36 | exposure curve for latent phosphor stripe image 18 | At screen center (narrowest) |
| 38 | exposure curve for latent phosphor stripe image 20 | At medial position (wider) |
| 40 | exposure curve for latent phosphor stripe image 22 | At screen edge (widest) |
| 42 | stripe width curve | For Ratio R = Dma-Dmi = 1.5 |
| 44 | stripe width curve | For R = 2.0 |
| 46 | stripe width curve | For R = 2.5 |
| 48 | stripe width curve | For R = 3.0; R is preferably 1.5 to 3.0 |
| 50 | terminal | metal cap, negative |
| 52 | terminal | metal cap, positive |
| 54 | body | ceramic |
| 56 | tube | glass |
| 58 | bore | In accordance with an aspect of this invention, tube 56 is caused to have a bore 58 dimensioned to produce light-emitting volume 16 of desired assymetrical cross-section. |
| Dma | major cross-sectional axis dimension | |
| Dmi | minor cross-sectional axis dimension | |
| Ic | latent image width | |
| Im | latent image width | |
| Ie | latent image width | |

Incorporation by Reference

Figure 8:
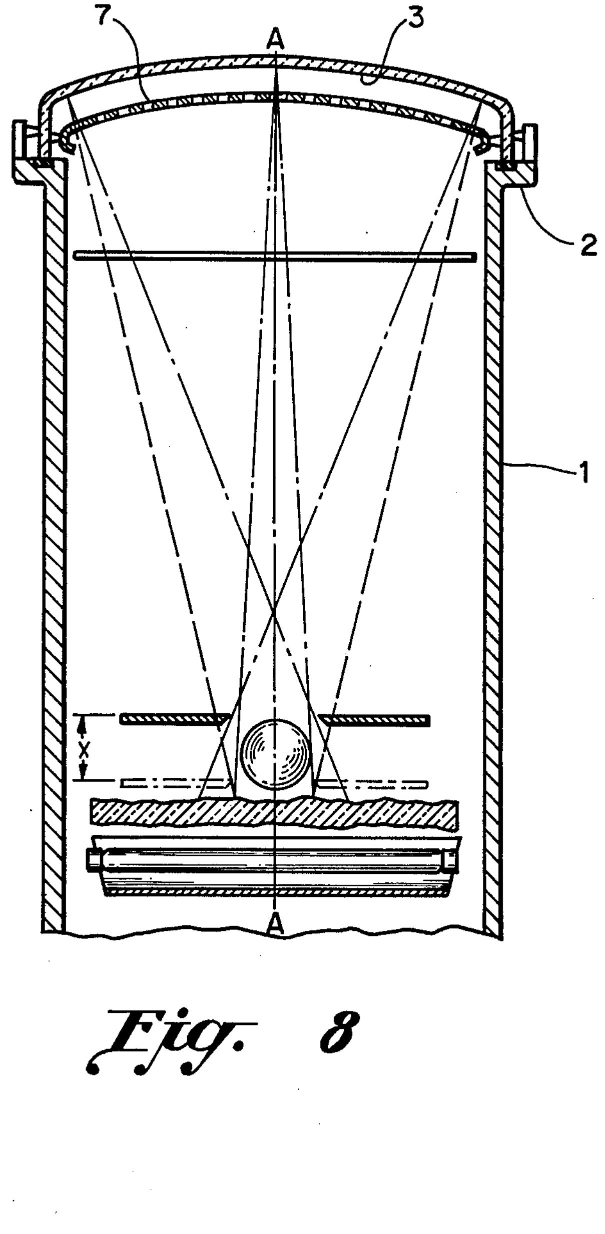
FIG. 8 is a fragmentary view, in cross-section, of an exposure chamber apparatus having means for supporting a curved faceplate which faceplate, in turn, includes means for supporting a slot mask.

For the purpose of supplementing this disclosure, the pertinent substance of the following are incorporated by reference herein:

| | Identification of Document | Portion Incorporated |
|---|---|---|
| 1. | U.S. Pat. No. 4,078,239 | Portion(s) depicting means 240 for supporting arc lamp 250 |
| 2. | U.S. Pat. No. 3,601,018 | Lighthouse enclosure 1 has a top face 2 for supporting the periphery of a faceplate 3 to which a shadow mask 7 is attached (See FIG. 8) |

While particular embodiments of the invention have been shown and described, it will be obvious to those skilled in the art that changes and modifications may be made without departing from the invention in its broader aspects. For example, the invention will find useful applications in the exposure of black grilles as it increases the intensity of exposure at the screen edges and thus permits decreased exposure intervals for a given latent image width. The aim, therefore, in the appended claims is to cover all such changes and modifications as fall within the true spirit and scope of the invention.

What is claimed is:

1. For use in fabricating a screen of a color cathode ray tube of the slot mask, stripe-screen type, a method for exposing a photosensitive coating on the concave inner surface of the faceplate of such a tube through a slot mask serving as an exposure master to form latent screen stripe images whose width increases with increasing radial distance along a screen pitch axis perpendicular to the screen stripe images, comprising:

supporting a curved faceplate which has a photosensitive coating on its concave inner surface;

supporting adjacent the faceplate inner surface a slot mask defining an array of columns of spaced slots;

supporting a line source of radiation actinic to said coating on or near a central axis of the faceplate and spaced from said coating, with the source axis aligned parallel to said columns of spaced slots in said mask, said light source producing a linear light-emitting volume having a major cross-sectional axis which is parallel to the faceplate central axis and a major cross-sectional axis dimension which is substantially greater than the minor cross-sectional axis dimension of said light emitting volume; and exposing said coating to said light source, such that the latent screen stripe images formed on said coating through said slots, for uniform exposure time and slot width, increase in width in a radial direction away from said screen center along said screen pitch axis.

2. The method defined by claim 1 wherein the ratio of said major and minor cross-sectional axial dimensions is about 1.5 to 3.0.

3. For use in fabricating a screen of a slot mask, stripe screen color cathode ray tube of the graded pitch type having a slot/stripe pitch which increases with increasing radial distance along a pitch axis perpendicular to the mask slots and screen stripes, a method for exposing a photosensitive coating on the concave inner surface of the faceplate of such a tube through a graded pitch slot mask serving as an exposure master to form latent screen stripe images whose width increases with increasing radial distance along a screen pitch axis, comprising:

supporting a curved faceplate which has a photosensitive coating on its concave inner surface;

supporting adjacent the faceplate inner surface a slot mask defining an array of columns of spaced slots;

supporting a line source of radiation actinic to said coating on or near a central axis of the faceplate and spaced from said coating, with the source axis aligned parallel to said columns of spaced slots in said mask, said light source producing a linear light-emitting volume having a major cross-sectional axis which is parallel to the faceplate central axis and a major cross-sectional axis dimension which is about 1.5 to 3.0 times greater than the minor cross-sectional axis dimension of said light emitting volume; and exposing said coating to said light source, such that the latent screen stripe images formed on said coating through said slots, for uniform exposure time and slot width, increase in width in a radial direction away from said screen center along said screen pitch axis.

4. For use in fabricating a screen of a color cathode ray tube of the slot mask, stripe-screen type, apparatus for exposing a photosensitive coating on the concave inner surface of the faceplate of such a tube through a slot mask serving as an exposure master to form latent screen stripe images whose width increases with increasing radial distance along a screen pitch axis perpendicular to the screen stripe images, said apparatus comprising:

means for supporting a curved faceplate which has a photosensitive coating on its concave inner surface;

means for supporting adjacent the faceplate inner surface a slot mask defining an array of columns of spaced slots;

a line source lamp producing radiation actinic to said coating and means for supporting said lamp on or near a central axis of the faceplate and spaced from said coating, with the source axis aligned parallel to said columns of spaced slots in said mask, said light source being structured and arranged to produce a linear light-emitting volume having a major cross-sectional axis which is parallel to the faceplate central axis and a major cross-sectional axis dimension which is substantially greater than the minor cross-sectional axis dimension of said light-emitting volume, whereby upon exposure of said coating to said light source, the latent screen stripe images formed on said coating through said slots, for uniform exposure time and slot width, increase in width in a radial direction away from said screen center along said screen pitch axis.

5. The apparatus defined by claim 4 wherein the ratio of said major and minor cross-sectional axial dimensions is about 1.5 to 3.0.

6. For use in fabricating a screen upon the inner surface of the faceplate of a slot mask, stripe screen color cathode ray tube of the "variable-pitch" type having a slot and stripe pitch which increases with increasing radial distance along a "pitch" axis perpendicular to the mask slot and screen stripes, apparatus for exposing a photosensitive coating on said concave inner surface of said faceplate of such a tube through a variable pitch slot mask serving as an exposure master to form latent screen stripe images whose width increases with increasingly radial distance along a screen "pitch" axis perpendicular to the screen stripe images, said apparatus comprising:

means for supporting a curved faceplate which has a photosensitive coating on its concave inner surface;

means for supporting adjacent the faceplate inner surface a slot mask defining an array of columns of spaced slots;

a light source comprising a high pressure mercury capillary arc lamp for producing radiation actinic to said coating and means for supporting said lamp on or near a central axis of the faceplate and spaced from said coating, with the axis, of said source aligned parallel to said columns of spaced slots in said mask, said light source having a glass tube with a bore structured and arranged such that a linear gaseous discharge is produced therein having a major cross-sectional axis which is parallel to the faceplate central axis and a major cross-sectional axis dimension which is about 1.5 to 3.0 times greater than the minor cross-sectional axis dimension of said light-emitting volume, whereby upon exposure of said coating to said light source, the latent screen stripe images formed on said coating through said slots, for uniform exposure time and slot width, increase in width in a radial direction away from said screen center along said screen pitch axis.

7. Apparatus for use in fabricating a screen upon the inner concave surface of the faceplate of a color cathode ray tube of the type having a slot mask and a stripe-screen, said apparatus comprising:

a light source for exposing a photosensitive coating on said concave inner surface of said faceplate of said tube through said slot mask serving as an exposure master to form latent screen stripe images whose width increases with increasing radial distance along a screen pitch axis perpendicular to the screen stripe images, said light source comprising a high pressure capillary arc lamp for producing radiation actinic to said coating, said lamp comprising a glass tube with a bore configured to produce therein a linear light-emitting volume with a major cross-sectional axis dimension which is substantially greater than the minor cross-sectional axis dimension of said light-emitting volume, means for supporting said lamp with the major cross-sectional axis of said lamp oriented parallel to the central axis, of said faceplate so as to expose said coating to said light source to form latent screen stripe images on said coating through said slots, which said images, for uniform exposure time and slot width, increase in width in a radial direction away from the center of said screen along said screen pitch axis.

8. The light source defined by claim 7 wherein the ratio of said major and minor cross-sectional axial dimensions is about 1.5 to 3.0.

* * * * *